(12) United States Patent
Yoshida

(10) Patent No.: US 7,342,608 B2
(45) Date of Patent: Mar. 11, 2008

(54) FOCUS DETECTING METHOD, FOCUS DETECTING MECHANISM AND IMAGE MEASURING DEVICE HAVING FOCUS DETECTING MECHANISM

(75) Inventor: Hiroyuki Yoshida, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 771 days.

(21) Appl. No.: 10/873,122

(22) Filed: Jun. 23, 2004

(65) Prior Publication Data

US 2004/0263672 A1    Dec. 30, 2004

(30) Foreign Application Priority Data

Jun. 27, 2003    (JP) .............................. 2003-184053

(51) Int. Cl.
- H04N 5/232    (2006.01)
- H04N 7/18    (2006.01)
- G02B 27/40    (2006.01)
- G02B 3/00    (2006.01)
- G02B 27/64    (2006.01)

(52) U.S. Cl. ........................ 348/353; 348/87; 348/135; 250/201.7; 250/559.19; 356/609

(58) Field of Classification Search .................. 348/86, 348/87, 135, 136, 142, 353, 354, 356; 250/207.1, 250/559.19, 559.2; 359/603, 604, 609

See application file for complete search history.

(56) References Cited

U.S. PATENT DOCUMENTS

| 3,290,124 | A |   | 12/1966 | Holtzclaw, Jr. |
| 4,027,134 | A |   | 5/1977 | Arakawa et al. |
| 4,829,374 | A | * | 5/1989 | Miyamoto et al. ............. 348/79 |
| 5,404,163 | A | * | 4/1995 | Kubo .......................... 348/142 |
| 5,604,344 | A | * | 2/1997 | Finarov .................. 250/201.7 |
| 6,075,558 | A | * | 6/2000 | Tachibana et al. ............ 348/80 |
| 6,490,541 | B1 | * | 12/2002 | Ariga et al. ................. 702/158 |
| 7,133,078 | B2 | * | 11/2006 | Nagasawa .................... 348/353 |

(Continued)

FOREIGN PATENT DOCUMENTS

EP    1 271 095 A2    1/2003

(Continued)

Primary Examiner—John M. Villecco
(74) Attorney, Agent, or Firm—Oliff & Berridge, PLC

(57) ABSTRACT

Focus detecting methods and focus detecting mechanisms of an image measuring device able to execute focus detection at high speed with high accuracy, and image measuring device having the focus detecting mechanisms are provided. A rotation driving device rotates and operates a grating filter for projecting a grating pattern to a measured object. A distance driving device adjusts the interval distance between an image pickup device and the measured object. The image of the measured object projecting the grating pattern thereto every predetermined rotating angle is picked up by the image pickup device via multiple exposure by operating the rotation driving device and the distance driving device in association with each other. A focus position is determined from a contrast value of the grating pattern within the picked-up image information. Accordingly, it is not necessary to pick-up plural images in plural distance positions and process the plural images. Therefore, times taken in the image picking-up and the image processing can be shortened and a focus detecting speed can be increased. Further, the focus detection can be performed with high accuracy since the contrast value is determined on the basis of frequency area information.

14 Claims, 10 Drawing Sheets

U.S. PATENT DOCUMENTS

| | | |
|---|---|---|
| 7,177,033 B2 * | 2/2007 | Yoshida .................. 356/601 |
| 2002/0191503 A1 | 12/2002 | Kataoka et al. |
| 2003/0169431 A1 * | 9/2003 | Moriuchi et al. .......... 356/601 |
| 2005/0109959 A1 * | 5/2005 | Wasserman et al. ... 250/559.19 |

FOREIGN PATENT DOCUMENTS

| | | | |
|---|---|---|---|
| JP | 09304685 A | * | 11/1997 |
| JP | 2001027517 A | * | 1/2001 |

* cited by examiner

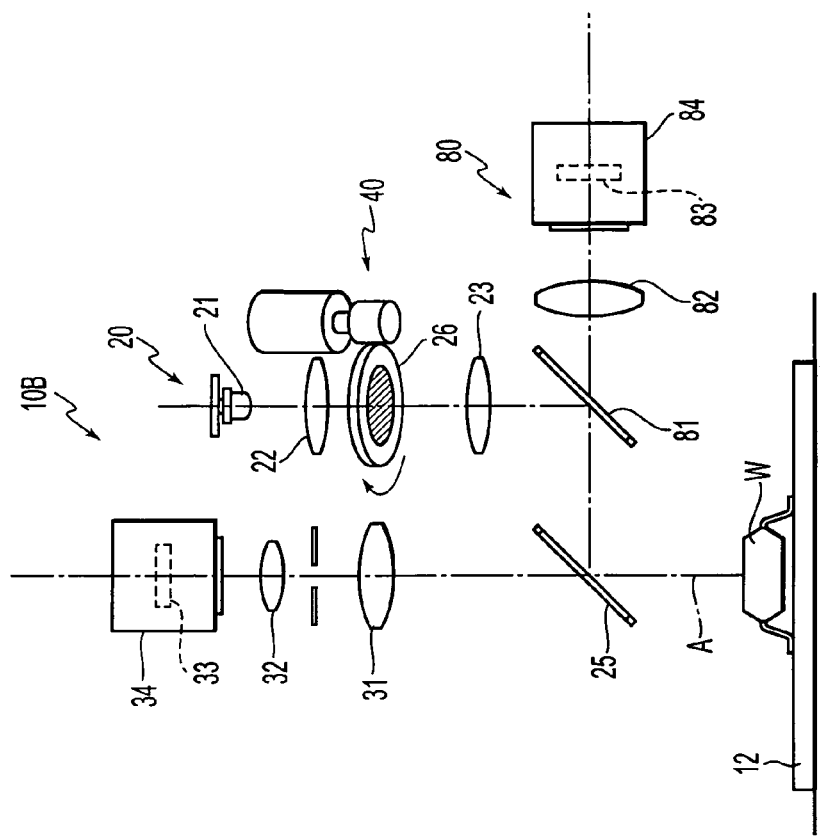
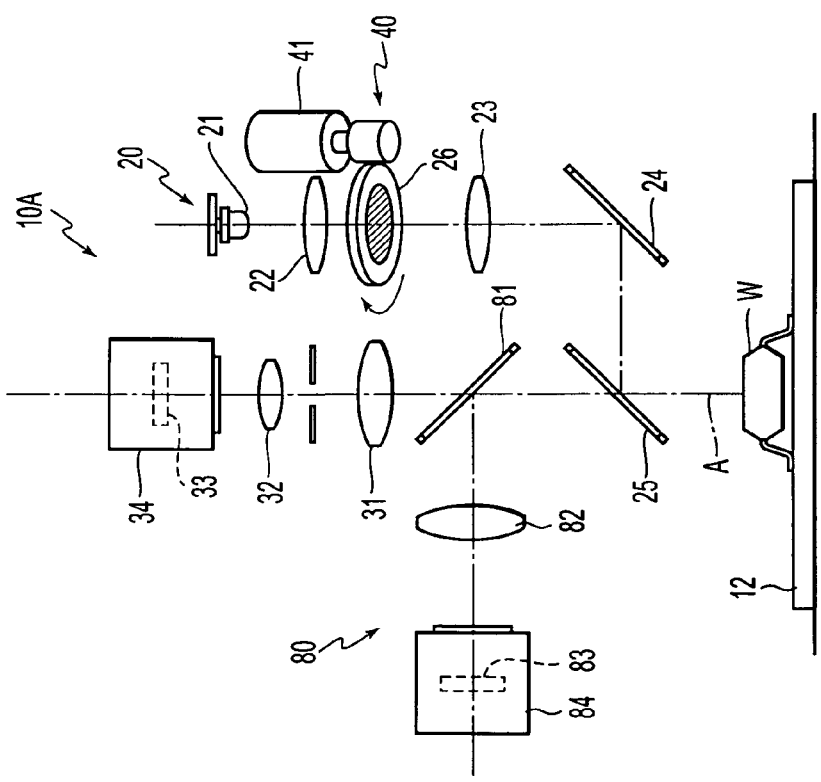
FIG. 10(A)
FIG. 10(B)

FOCUS DETECTING METHOD, FOCUS DETECTING MECHANISM AND IMAGE MEASURING DEVICE HAVING FOCUS DETECTING MECHANISM

BACKGROUND OF THE INVENTION

1. Field of Invention

The present invention relates to a focus detecting method, a focus detecting mechanism, and an image measuring device having focus detecting mechanism.

2. Description of Related Art

JP-A-8-226805 discloses a focusing (focus detecting) method for adjusting the optical distance from a workpiece to an image pickup means in an image measuring device (non-contact measuring device) having the image pickup means for picking-up the image of a measured object (workpiece), and measuring the shape, size, etc. of the workpiece by suitably processing the image picked up by this image pickup means.

The image measuring device described in JP-A-8-226805 has a CCD camera as the image pickup means for picking-up the image of the workpiece and outputting its image data, a focusing adjusting means for adjusting the optical distance between the CCD camera and the workpiece, a line sensor for picking-up the image of the workpiece by one line, and a contrast arithmetic means (circuit) for calculating a contrast from the image picked up by this line sensor. The line sensor is arranged in a position in which the optical distance between the line sensor and the workpiece is equal to the optical distance between the CCD camera and the workpiece.

In the focus detecting method described in JP-A-8-226805, while the optical distances between the workpiece, the CCD camera and the line sensor are adjusted by the focusing adjusting means, the contrast is calculated in plural distance positions from the image picked up by the line sensor and a position for maximizing the contrast is detected as the focus position. The focus detecting method is constructed such that the image picked up by the CCD camera can be focused by adjusting the optical distance between the CCD camera and the workpiece by the focusing adjusting means on the basis of the detected focus position.

SUMMARY OF THE INVENTION

However, in the image measuring device of JP-A-8-226805, the focus position is detected in the focus detection on the basis of plural images picked up by the line sensor in the plural distance positions. Accordingly, although the images are picked up by one line, a problem exists in that it takes time for picking-up each of the images and time for processing the image by the contrast arithmetic means so that no focus detection can be performed at high speed.

Further, the focus detection is executed on the basis of the images on one line able to be picked up by the line sensor. Therefore, no desired area of focus can be arbitrarily selected within the entire image pickup range of the CCD camera. Accordingly, a problem exists in that no focus accuracy can be raised in the case of the workpiece having irregularities on its surface, etc.

Various exemplary embodiments of systems and methods according to the present invention provide a focus detecting method and a focus detecting mechanism of the image measuring device able to execute the focus detection at high speed with high accuracy, and an image measuring device having the focus detecting mechanism.

In various exemplary embodiments, a method for detecting focus in an image measuring device comprises: providing a grating pattern to be projected onto a measured object at an angle between an orientation of the grating pattern and a reference direction and at a distance between the measured object and an image pick-up device of the image measuring device; performing a first projection of the grating pattern onto the measured object at a first angle and at a first distance; performing a second projection of the grating pattern onto the measured object at a second angle and at a second distance; obtaining a first contrast value and a second contrast value based on the first and second projections, respectively; and determining a focus distance based on the first and second contrast values.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail, with reference to the following figures, wherein:

FIGS. 10A and 10B are views showing the schematic construction of one portion of an image measuring device in accordance with a second exemplary embodiment of the present invention.

DETAILED DESCRIPTION OF EXEMPLARY EMBODIMENTS

Figure 1:
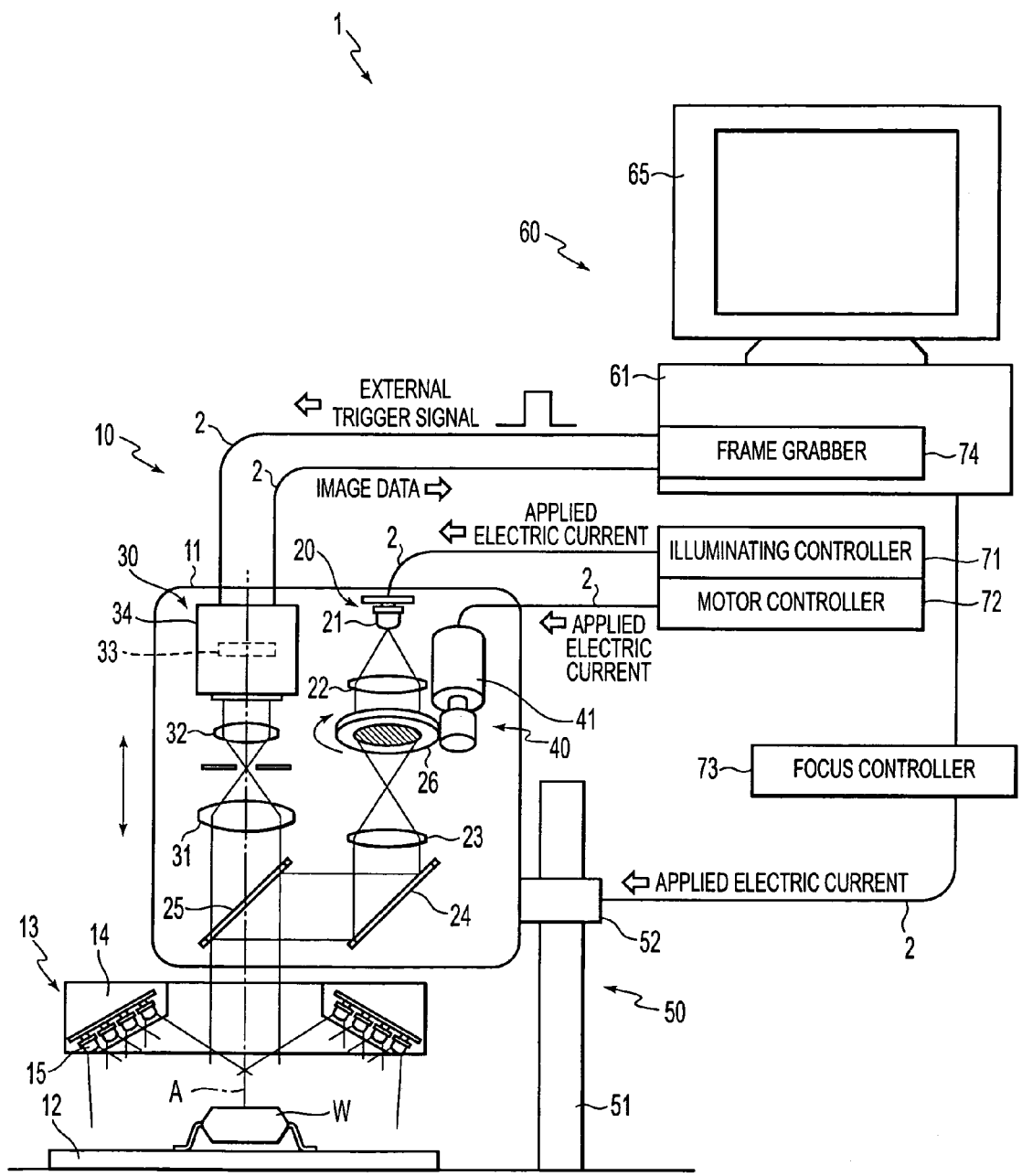
FIG. 1 is a view showing the schematic construction of an image measuring device in accordance with a first exemplary embodiment of the present invention.

Various exemplary embodiments of a focus detecting mechanism and an image measuring device having the focus detecting mechanism in the present invention will next be shown and explained in detail on the basis of the drawings. In the following explanation, the same constructional elements are designated by the same reference numerals and their explanations are omitted or simplified.

In various exemplary embodiments, an image measuring device has an image pickup device arranged on an optical axis crossing a measured object and picking-up an image of the measured object, and measures the shape of the measured object from the picked-up image.

FIGS. 1 to 9 show an image measuring device 1 in accordance with a first exemplary embodiment of the present invention. FIG. 10 shows one portion of an image measuring device in accordance with a second exemplary embodiment of the present invention.

Figure 2:
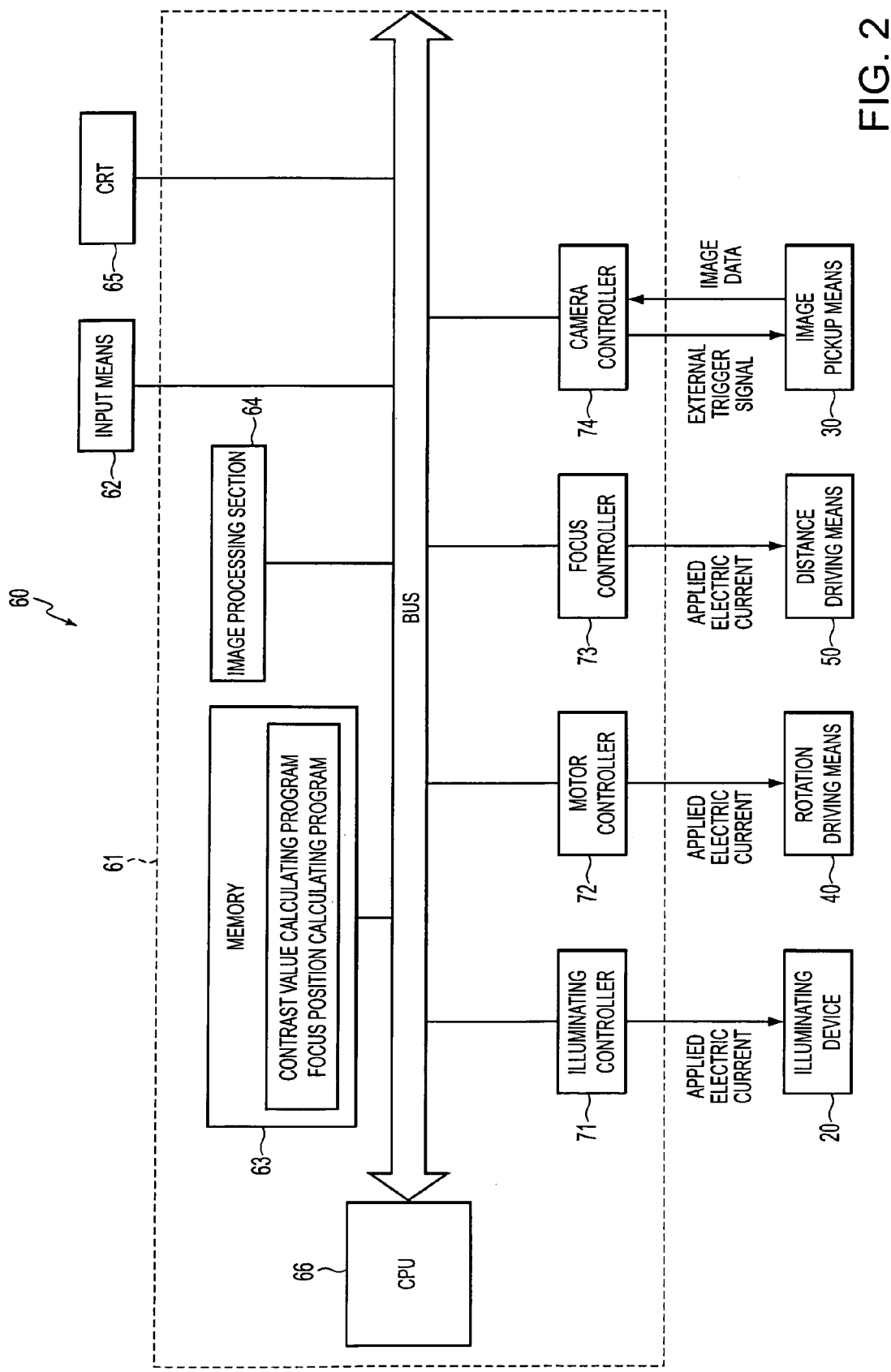
FIG. 2 is a block diagram showing the construction of the image measuring device of FIG. 1.

FIG. 1 is a view showing the schematic construction of the image measuring device 1 in the first exemplary embodiment. FIG. 2 is a block diagram showing the construction of the image measuring device 1.

In FIG. 1, the image measuring device 1 is constructed by arranging a device main body section 10 and a device control section 60. The device main body section 10 irradiates illumination light to a workpiece W as a measured object and picks-up reflected light from the workpiece W as an image. The device control section 60 processes the image of the workpiece W picked up by this device main body section 10 and controls the operation of the image device main body section 10. The device main body section 10 and the device control section 60 are connected to each other by a cable 2.

The device main body section 10 has a box body 11 of a hollow box shape, a stage 12 for placing the workpiece W thereon, and a ring illuminating device 13 arranged by surrounding an optical axis A perpendicular to the upper face of the stage 12 and vertically extended. An illuminating device 20 for irradiating the illumination light from just above the workpiece W, and an image pickup device 30 for receiving the reflected light from the workpiece W and picking-up the image are arranged within the box body 11. An opening with the optical axis A as a center is arranged on the bottom face opposed to the stage 12 of the box body 11, and the reflected light from the workpiece W can reach the image pickup device 30 through this opening. The box body 11 and the stage 12 are constructed so as to be moved and operated in two directions (X and Y directions) crossing the optical axis A so that the measured part of the workpiece W can be suitably adjusted.

The ring illuminating device 13 irradiates the illumination light of a ring-shaped light beam to the workpiece W from a slanting direction with respect to the optical axis A. The ring illuminating device 13 has a box body 14 of a hollow ring shape with the optical axis A as a center, and a white light emitting diode (LED) 15 as a light emitting source arranged within the box body 14. Plural LEDs 15 are arranged in a ring shape so as to surround the optical axis A and are divided into a front portion, a back portion, a left portion and a right portion in four directions seen from a plane. The divided front portion, back portion, left portion and right portion are respectively independently controlled in intensity of the illumination light.

The illuminating device 20 has a xenon flash lamp 21 as the light emitting source, lenses 22, 23 for converging illumination light diffused from the xenon flash lamp 21, and a reflecting mirror 24 for reflecting the illumination light toward the optical axis A. A half mirror 25 for reflecting the illumination light reflected on the reflecting mirror 24 toward the workpiece W is arranged on the optical axis A. The illumination light irradiated from the xenon flash lamp 21 is irradiated to the workpiece W from just above along the optical axis A. The reflected light reflected on the workpiece W can be transmitted through the half mirror 25 toward the image pickup device 30. The xenon flash lamp 21 is connected to an illuminating controller 71 arranged in the device control section 60 through the cable 2.

A grating filter 26 for projecting a grating pattern to the workpiece W is arranged between the lenses 22, 23 of the illuminating device 20. Namely, the grating filter 26 is arranged in a position for interrupting the illumination light irradiated from the xenon flash lamp 21 toward the workpiece W. This grating filter 26 has plural slits 26A (FIG. 5) formed in parallel with each other and able to transmit the illumination light of the xenon flash lamp 21. The grating pattern 26B (FIG. 5) is projected to the workpiece W by the illumination light transmitted through these slits 26A. The grating filter 26 is constructed so as to be rotated and operated by a rotation driving device 40. The rotation driving device 40 has a drive motor 41, and this drive motor 41 is connected to a motor controller 72 arranged in the device control section 60 through the cable 2.

The image pickup device 30 is constructed by arranging condenser lenses 31, 32 arranged along the optical axis A and converging the reflected light from the workpiece W, and a CCD camera 34 having a charge coupled device 33 for receiving light from the condenser lenses 31, 32.

The CCD camera 34 receives the reflected light from the workpiece W by the charge coupled device 33, and picks up the image of the workpiece W. The picked-up image is image data constructed by a finite number of pixels such as 512×512 pixels in image size. For example, each pixel is constructed by data of 8 bits. In these data of 8 bits, the intensity of the receiving light is shown by a shading value (light receiving intensity value) partitioned into 256 gradations from 0 to 255. Further, the CCD camera 34 is constructed so as to continuously obtain the image of several ten frames such as 30 frames for one second (30 fps). The image data from the CCD camera 34 are outputted to a frame grabber 74 as a camera control section arranged in the device control section 60 through the cable 2.

The interval distance (focus distance) between the image pickup device 30 and the workpiece W is adjustably constructed by a distance driving device 50 for moving the box body 11 in a direction (Z-direction) along the optical axis A. The distance driving device 50 has a guide rail 51 arranged on the stage 12 side and extended in parallel with the optical axis A, and a driving section 52 operated along this guide rail 51 and attached to the box body 11. The driving section 52 is connected to a focus controller 73 arranged in the device control section 60 through the cable 2. The guide rail 51 and the driving section 52 can be constructed by a rack and pinion, a worm gear, or the like. In this case, it is sufficient for the driving section 52 to have a servo motor, etc. Further, the guide rail 51 and the driving section 52 may be also constructed by a linear motor, etc.

The device control section 60 is constructed by arranging a computer 61 for receiving the image data from the CCD camera 34 and processing the image data and outputting and displaying the processed image data, the illuminating controller 71 connected to this computer 61, the motor controller 72, the focus controller 73, and the frame grabber 74 integrally arranged in the computer 61. The illuminating controller 71 controls lighting of the illuminating device 20 by receiving commands from the computer 61 and controlling an applying electric current applied to the illuminating device 20. The motor controller 72 controls the operation of the drive motor 41 and controls the rotation and operation of the grating filter 26 by receiving commands from the computer 61 and controlling an applying electric current applied to the drive motor 41 of the rotation driving device 40. The focus controller 73 controls the operation of the driving section 52 and controls the movement of the box body 11 along the optical axis A by receiving commands from the computer 61 and controlling an applying electric current applied to the driving section 52 of the distance driving device 50. The frame grabber 74 transmits an external trigger signal (pulse) to the image pickup device 30 and controls exposure of the CCD camera 34 by receiving commands from the computer 61.

The illuminating controller 71, the motor controller 72 and the focus controller 73 may be arranged integrally with the computer 61. Further, the camera control device (the frame grabber 74) may be also arranged separately from the computer 61.

In FIG. 2, the computer 61 has an input section 62 for setting and inputting various kinds of parameters (instruction values) relating to an image measurement, a memory 63 for memorizing and storing various kinds of programs and data, an image processing section 64 for processing the image data from the CCD camera 34, and a display section (CRT) 65 for outputting and displaying a processing result in the image processing section 64. The computer 61 has a CPU (central processing unit) 66 as an arithmetic section for controlling the entire operation of the device control section 60. The CPU 66, the input section 62, the memory 63, the image processing section 64 and the CRT 65 are connected to each other through a bus.

As shown in FIG. 2, the illuminating controller 71, the motor controller 72, the focus controller 73 and the frame grabber 74 can be respectively assembled as one portion of functions mounted to the computer 61 as the illuminating control section (illuminating controller) 71, the motor control section (motor controller) 72, the focus control section (focus controller) 73 and the camera control section (frame grabber) 74. Further, the illuminating control section 71, the motor control section 72, the focus control section 73 and the camera control section 74 may be also constructed so as to control the operations of the illuminating device 20, the rotation driving means 40, the distance driving means 50 and the image pickup device 30 by storing these sections to the memory 63 as programmed software and performing arithmetic processing by the CPU 66.

The input means 62 is constructed by a lever or a button, etc. arranged so as to face the exterior and be manually operated. Instruction values for controlling the operations of the illuminating device 20, the rotation driving means 40, the distance driving means 50 and the image pickup device 30 are inputted to the input means 62. The instruction values set and inputted by the input means 62 are sent to the CPU 66 through a bus.

The CPU 66 gives instructions to the illuminating control section 71, the motor control section 72, the focus control section 73 and the camera control section 74 on the basis of the instruction values sent from the input section 62, and controls the operations of the illuminating device 20, the rotation driving device 40, the distance driving device 50 and the image pickup device 30. Further, the CPU 66 detects the focus distance of the image pickup device 30 with respect to the workpiece W by reading programs (e.g. a contrast value calculating program, a focus position calculating program, etc.) stored to the memory 63, and executing these programs.

The image processing section 64 performs edge detection, etc. by processing image data picked up by the image pickup device 30 and calculates the shape, size, color, etc. of the workpiece W by arithmetic processing.

The CRT 65 displays an image measuring result calculated by the image processing section 64.

The image measuring method in the image measuring device 1 will next be explained on the basis of FIGS. 3 to 9.

Figure 3:
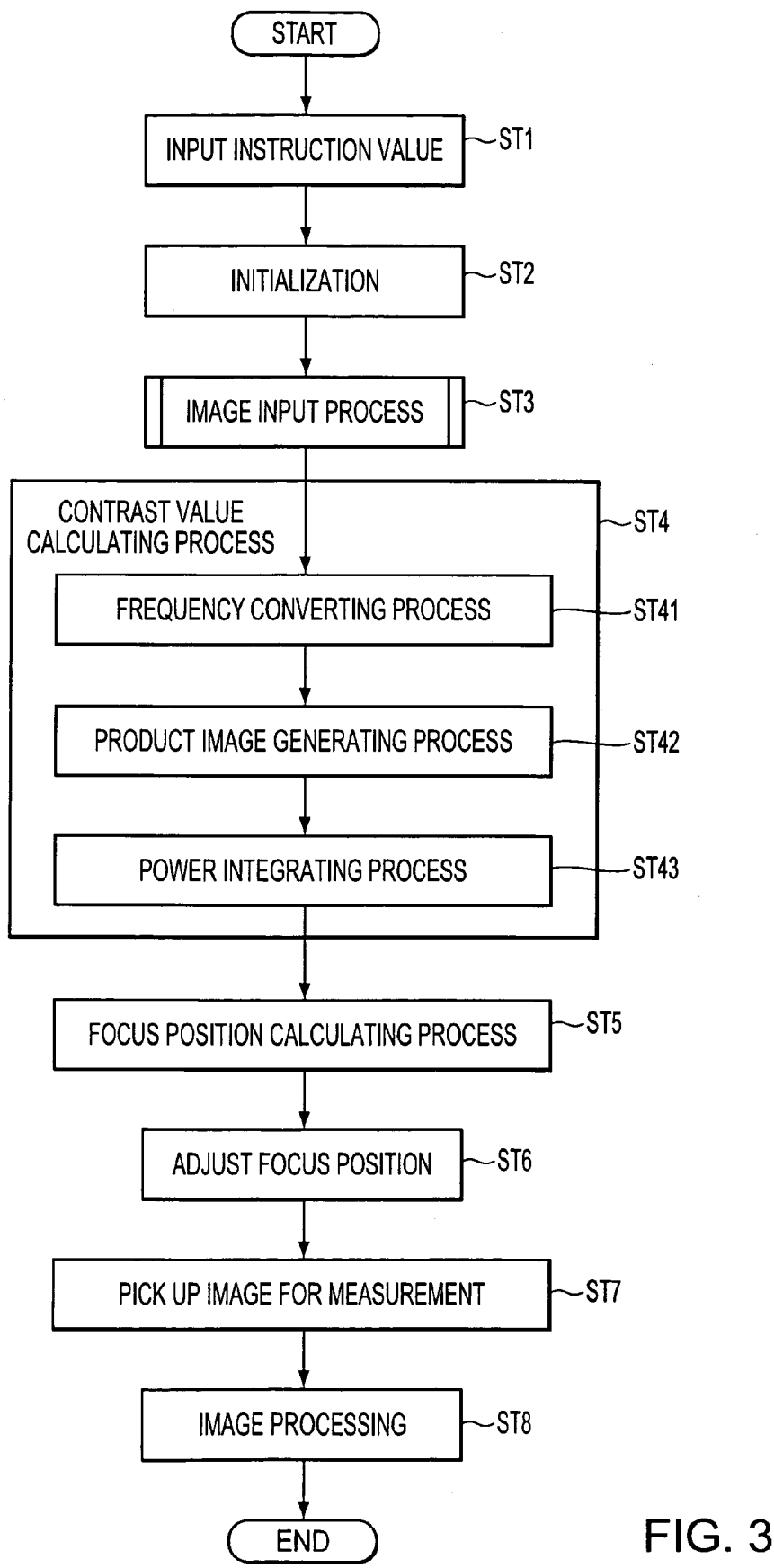
FIG. 3 is a flow chart showing an image measuring method in the image measuring device of FIG. 1.
Figure 4:
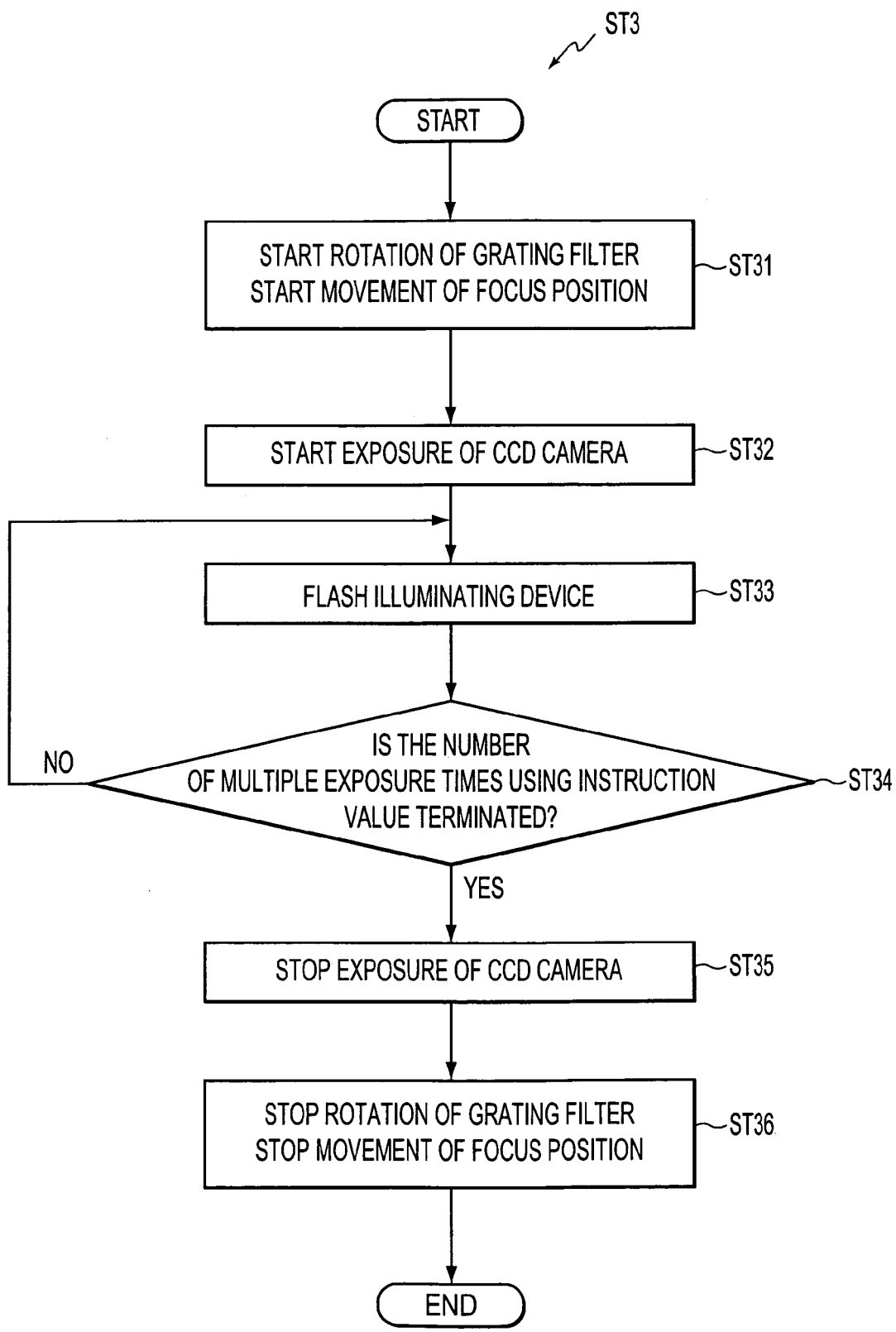
FIG. 4 is a flow chart showing an image input process in the image measuring method of FIG. 3.

FIGS. 3 and 4 are a flow chart showing the image measuring method in the image measuring device 1 and a flow chart showing an image input process in the focus detection.

In FIG. 3, an instruction value is first inputted from the input section 62 (ST1). As this instruction value, there are instruction values for controlling the operations of the illuminating device 20, the rotation driving device 40, the distance driving device 50 and the image pickup device 30, instruction values for setting an executing range of the image measurement and a focus detecting range, etc.

When the instruction value is inputted, the CPU 66 gives instructions to the illuminating control section 71, the motor control section 72, the focus control section 73 and the camera control section 74, and initializes the illuminating device 20, the rotation driving device 40, the distance driving device 50 and the image pickup device 30 (ST2).

Next, the CPU 66 gives instructions to the illuminating control section 71, the motor control section 72, the focus control section 73 and the camera control section 74 and obtains image information P1 (FIG. 7A) by controlling the operations of the illuminating device 20, the rotation driving device 40, the distance driving device 50 and the image pickup device 30 (ST3).

In the image input process ST3, the image information P1 picked up by multiple exposure is obtained by operating the illuminating device 20, the rotation driving device 40, the distance driving device 50 and the image pickup device 30 in association with each other as shown in FIG. 4.

Namely, in a process ST31, the grating filter 26 is rotated by driving the drive motor 41 of the rotation driving device 40, and the box body 11 and the image pickup device 30 begin to be moved in the direction separated from the workpiece W (or direction approaching the workpiece W) by operating the driving section 52 of the distance driving device 50. Subsequently, the exposure of the CCD camera 34 of the image pickup device 30 is started (ST32).

The xenon flash lamp 21 of the illuminating device 20 is then flashed and lighted every predetermined rotating angle in accordance with the rotating angle of the grating filter 26 (ST33). This flash lighting of the xenon flash lamp 21 is repeated by the number of times (the number of multiple exposure times) according to the instruction value (ST34). Thereafter, the exposure of the CCD camera 34 is terminated (ST35). Further, the operation of the drive motor 41 of the rotation driving device 40 is stopped and the rotation of the grating filter 26 is stopped. Thus, the operation of the driving section 52 of the distance driving device 50 is stopped and the movements of the box body 11 and the image pickup device 30 are stopped (ST36).

Figure 5:
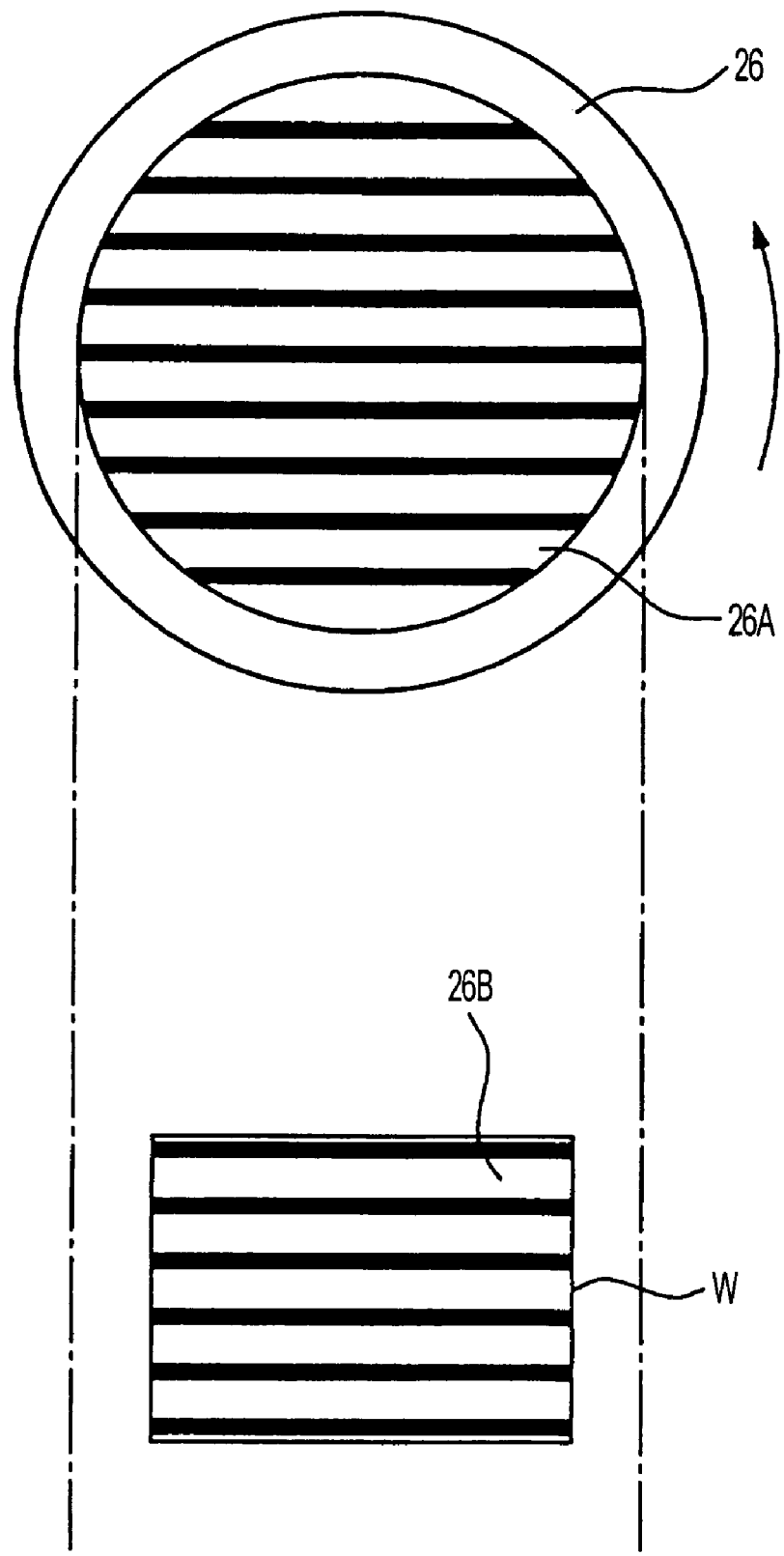
FIG. 5 is a view showing an exemplary grating filter at a focus detecting time of the image measuring method of FIG. 3, and an exemplary workpiece projecting a grating pattern thereto.
Figure 6A:
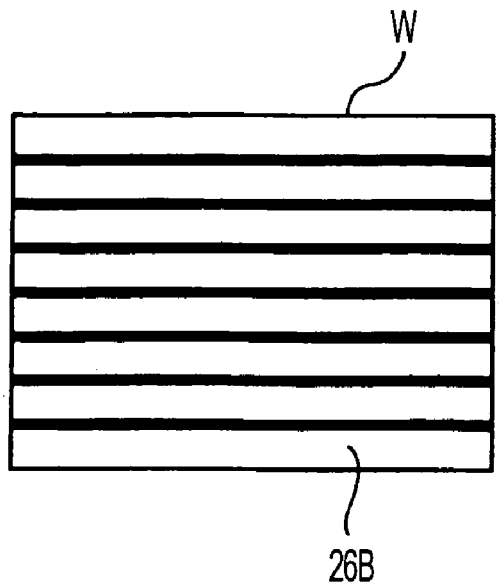
FIGS. 6A to 6D are views showing the workpiece projecting the grating pattern of FIG. 5.
Figure 6B:
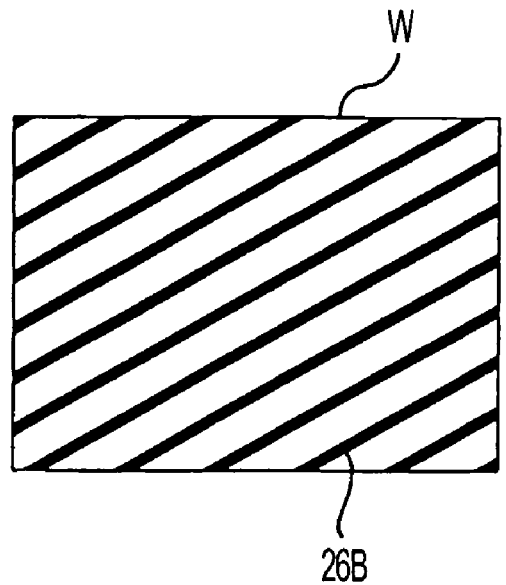
Figure 6C:
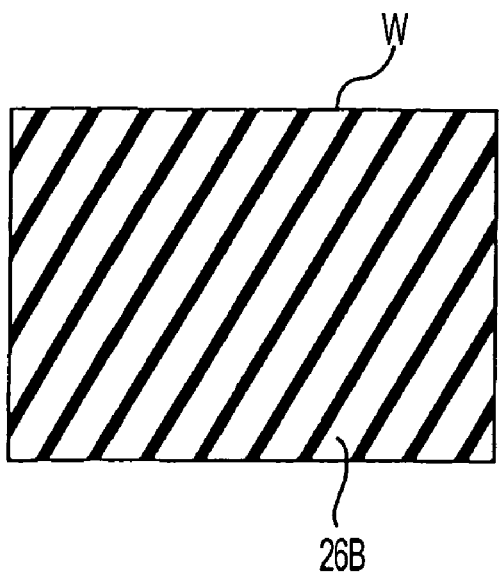
Figure 6D:
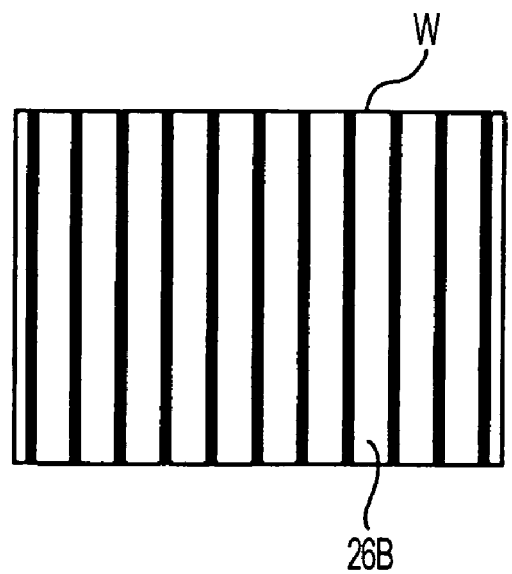
Figure 7A:
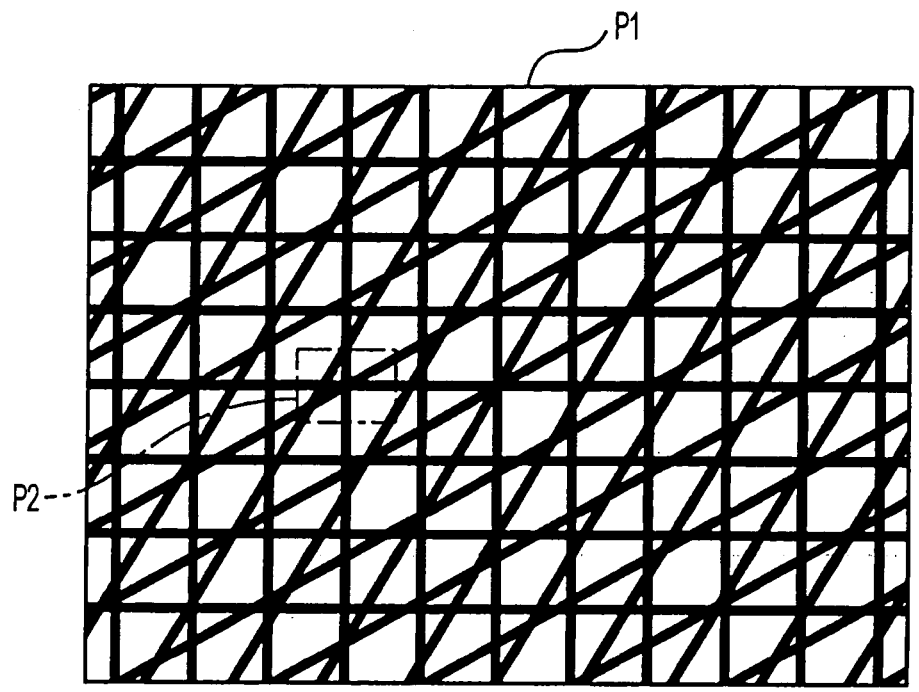
FIGS. 7A and 7B are views showing image information obtained at the focus detecting time of FIG. 5 and the image information of a focus detecting range.
Figure 7B:
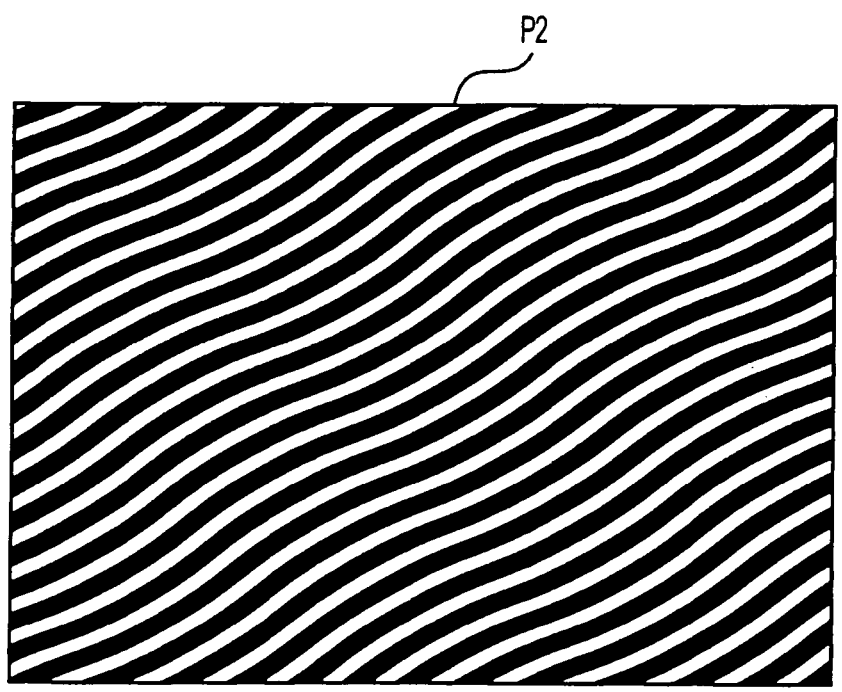
Figure 8A:
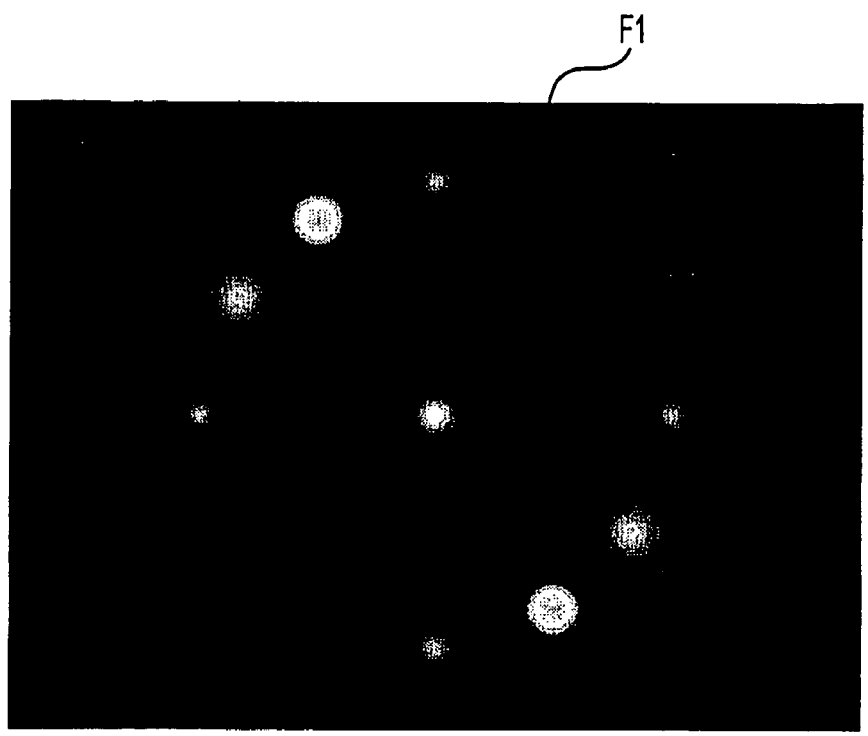
FIGS. 8A and 8B are views showing frequency area information obtained by converting the image information of FIGS. 7A and 7B of the focus detecting range into a frequency area, and a product image generated on the basis of the frequency area information.
Figure 8B:
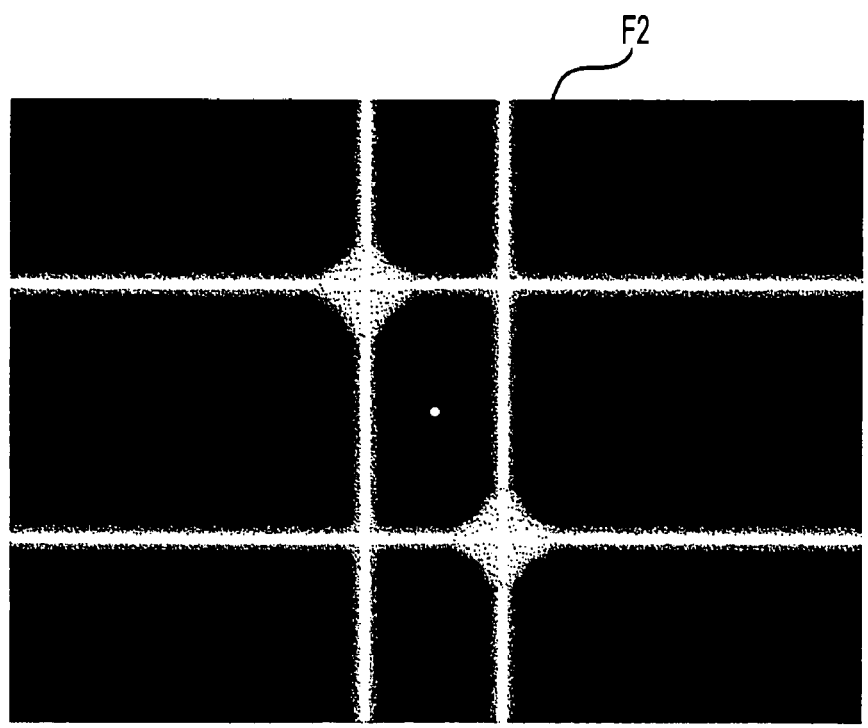

The image information obtained in the above processes ST31 to ST36 will be explained on the basis of FIGS. 5 to 7. FIGS. 5 and 6 are views showing the grating filter 26 used in the focus detection and the workpiece W upon which the grating pattern 26B is projected. FIGS. 7A and 7B are views showing the image information P1 obtained by the multiple exposure in the focus detection and image information P2 of the focus detecting range.

As shown in FIGS. 5 and 6, the illumination light of the xenon flash lamp 21 passing through the slit 26A of the grating filter 26 is projected to the workpiece W as the grating pattern 26B according to the rotating angle of the grating filter 26. In FIGS. 6A to 6D, the grating pattern 26B projected every 30 degrees as a predetermined rotating angle is shown. Since the images of the workpiece W projecting these grating patterns 26B thereto are picked up by the multiple exposure, the grating patterns 26B of plural angles are overlapped and picked up within one image information P1 as shown in FIG. 7A. FIG. 7B enlargedly shows the image information P2 of a range for executing the focus detection among the obtained image information P1.

The predetermined rotating angle for projecting the grating pattern 26B can be set by the instruction value inputted from the input device 62. For example, the predetermined rotating angle can be set to 10 degrees obtained by dividing the angle from 0 degree to 90 degrees into nine angular sections. When the predetermined rotating angle is set to 10 degrees, the grating patterns 26B of ten combinations from 0 degree to 90 degrees are projected to the workpiece W, and the image information P1 provided by the multiple exposure of these grating patterns 26B is obtained.

Further, the operating speed of the distance driving device 50 can be set by the instruction value inputted from the input device 62. For example, this operating speed can be set so as to make the movement every 0.5 mm every time the grating filter 26 is rotated by 10 degrees.

Next, with reference to FIG. 3, a contrast value for every predetermined rotating angle of the grating filter 26 is calculated with respect to the image information P2 of the range for executing the focus detection among the image information P1 obtained in the image input process ST3 (ST4). This contrast value calculating process ST4 has a frequency converting process ST41, a product image generating process ST42 and a power integrating process ST43. Frequency area information F1 provided by converting the image information P2 into a frequency area and a product image F2 generated by overlapping a frequency filter with the frequency area information F1 are obtained as typically shown in FIGS. 8A and 8B in the frequency converting process ST41 and the product image generating process ST42.

Namely, in the frequency converting process ST41, the shading value of a pixel constituting the image information P2 is converted into a frequency area by the two-dimensional Fourier transformation so that the frequency area information F1 is calculated. Further, in the product image generating process ST42, the frequency filter relating to the grating pattern 26B for every predetermined rotating angle is overlapped with (is multiplied by) the frequency area information F1 so that the product image F2 for every predetermined rotating angle is generated. Here, the frequency filter relating to the grating pattern 26B is a filter in which the grating pattern 26B projected before the workpiece W is placed on the stage 12 is picked up for every predetermined rotating angle of the grating filter 26 and these picked-up data are converted into a frequency. Such a frequency filter is prepared in advance correspondingly to the grating pattern 26B for every predetermined rotating angle, and is stored to the memory 63.

The frequency filter is not limited to the filter based on the grating pattern 26B actually picked up, but may also be a filter obtained by the frequency conversion from the image information of the grating pattern made by a simulation using a computer, etc.

In the power integrating process ST43, the power for every pixel constituting the product image is integrated with respect to each product image F2 for every predetermined rotating angle, and the contrast value of the product image F2 is calculated. Namely, since the product image F2 for every predetermined rotating angle is generated by multiplying the frequency area information F1 and the frequency filter for every predetermined rotating angle, the contrast of the picked-up grating pattern 26B is different every product image F2. As this contrast is increased (focused), the integrated power Wi (contrast value of the product image F2) is increased.

Each process in the above contrast value calculating process ST4 is executed by a calculation of the CPU 66 on the basis of the image information P1, P2 obtained by the image pickup device 30 and the contrast value calculating program read from the memory 63.

Figure 9:
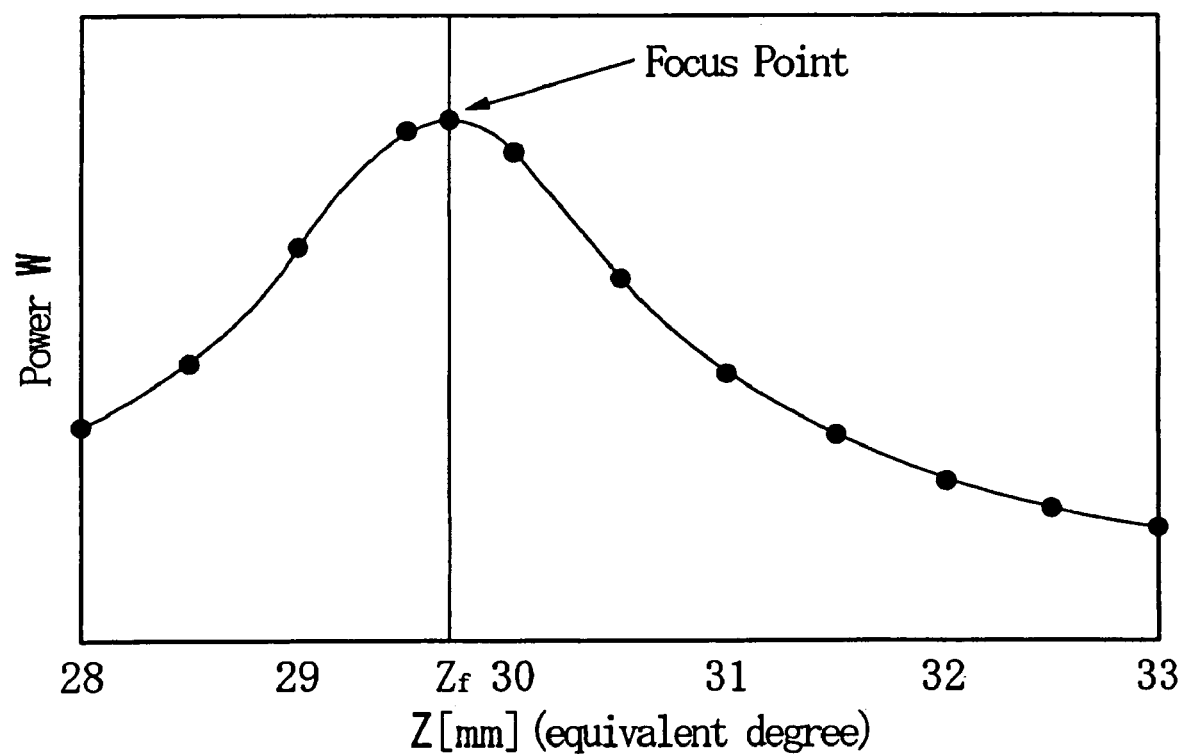
FIGS. 9A and 9B are views showing power of the product image of FIGS. 8A and 8B as a graph with respect to a focus distance.

Next, in a focus position calculating process ST5, the CPU 66 reads the focus position calculating program from the memory 63, and calculates the focus position on the basis of the contrast value of the product image F2 for every predetermined rotating angle. Namely, since the rotation driving device 40 and the distance driving device 50 are operated in association with each other by commands of the CPU 66 through the motor control section 72 and the focus control section 73, the rotating angle of the grating filter 26 and the interval distance (focus distance Z) between the image pickup device 30 and the workpiece W are set to be univocally relative to each other. Therefore, the rotating angle of the grating filter 26 is replaced with the focus distance Z, and this focus distance Z and the power Wi (contrast value) of the product image F2 are provided as shown by a curve in the graph of FIG. 9. In the graph of FIG. 9, the axis of abscissa shows the focus distance Z and the axis of ordinate shows the power Wi (contrast value). The power Wi for every product image F2 is plotted and these plotted points are connected to each other by a regression curve. This curve is formed in a shape having a peak value and the focus distance Z corresponding to this peak value becomes a focus distance Zf showing the focus position.

Such a focus distance Zf showing the focus position is calculated by the following formula from the power Wi for every product image F2 and the focus distance Zi.

$$Z_f = \frac{\sum_i Z_i \cdot W_i}{\sum_i W_i}.$$

As mentioned above, the focus distance Zf showing the focus position is calculated by multiplying the focus distance Zi for every product image F2 by the power Wi for every product image F2 and taking a weighted average of the multiplied value. Therefore, the focus distance Zf can be accurately calculated even when the focus distance Zf and one of the focus distances Zi every product image F2 are not conformed to each other.

The focus detecting method of the present invention is constructed by the above processes ST3 to ST5.

When no peak value appears in the power Wi for every product image F2 in the focus position calculating process ST5, i.e., when there is no focus position in the range of the picked-up focus distance Z, the control range of the distance driving device 50 is initialized and changed and the respective processes ST2 to ST5 may be also again executed.

Next, the CPU 66 operates the distance driving device 50 and adjusts the focus position by giving instructions to the focus control section 73 in accordance with the calculated focus position (focus distance Zf) (ST6). The CPU 66 also controls the operation of the image pickup device 30 and picks up an image for a measurement by giving instructions to the camera control section 74 (ST7).

The picked-up image data are then inputted to the image processing section 64, and the image processing is executed by the image processing section 64 (ST8). The image measuring result is displayed in the CRT 65 and the image measurement is terminated.

The image information P1 obtained in the image input process ST3 is not limited to one information, but the image measuring device 1 shown in FIG. 1 may be also constructed such that two or more plural image information P1 may be obtained. When the plural image information P1 is picked up, the operating speeds of the rotation driving device 40 and the distance driving device 50 are constantly set and the moving distance of the image pickup device 30 is set to be long and the range of the focus distance Z may be also enlarged. If the moving distance of the image pickup device 30 is constant, the divisional interval of the focus distance Z in the image information P1 may be also reduced by setting a slow operating speed of the distance driving device 50, and/or raising the operating speed of the rotation driving device 40, and shortening the flash interval of the illuminating device 20. In this case, if the grating filter 26 is rotated every 180 degrees (one cycle) while one image information P1 is picked up, no angles of the grating patterns 26B included within the one image information are overlapped with each other and the focus detection can be reliably executed with respect to the focus detecting range according to the number of image information.

The plural image information P1 can be continuously picked up within one image input process ST3. In the contrast value calculating process ST4 and the focus position calculating process ST5, it is sufficient to execute the arithmetic processing with respect to each of the plural image information P1. Thus, the focus detectable distance can be extended and the adjusting range can be enlarged. Otherwise, the accuracy of the focus detection can be improved by finely dividing the focus distance Z.

In accordance with the above embodiments, the following effects are obtained.

(1) Since the image information P1 picked up by the image pickup device 30 is picked up by the multiple exposure, information picked up in plural positions is included in the image information P1 with respect to the interval distance (focus distance Z) between the workpiece W and the image pickup device 30 controlled by the distance driving device 50. Accordingly, it is not necessary to pick up plural images in the plural distance positions so that time for picking-up the image information P1 can be shortened. Further, since it is not necessary to process the plural images, time taken in the image processing can be also shortened so that the focus detection can be executed at high speed.

(2) Since the distance driving device 50 and the rotation driving device 40 are operated in association with each other, the contrast of the grating pattern 26B included in the picked-up image information P1 is changed in accordance with the focus distance Z, and the contrast of the grating pattern 26B picked up in the position near the focus distance Zf of the focus position is raised. Thus, the focus position can be detected with high accuracy by calculating the rotating angle position of the high contrast from one image information P1 in which the grating patterns 26B of plural rotating angle positions are picked up by the multiple exposure.

(3) The detecting accuracy of the focus position required in accordance with the rotating angle can be improved since the grating angle of the grating pattern 26B projected in the image picking-up using the multiple exposure can be easily finely set, i.e., the predetermined rotating angle can be easily reduced by controlling the operation of the rotation driving device 40.

(4) Before the image for the measurement is picked up, the image information P1 for the focus detection is obtained by the image pickup device 30 for picking-up the image of the workpiece W in the image measurement. The focus position can be calculated on the basis of this image information P1. Accordingly, it is not necessary to arrange a line sensor, a contrast arithmetic circuit, etc. as in the conventional image measuring device so that the device can be set to a simple structure and can be made compact.

(5) Processing for calculating the contrast value every predetermined rotating angle can be executed at high speed by converting the image information P1 obtained in the image input process ST3 into the frequency area information F1 by the frequency converting process ST41. Further, processing in the frequency converting process ST41 can be executed at high speed by adopting the two-dimensional Fourier transformation (two-dimensional FFT) as a technique for calculating the frequency area information F1.

(6) If only the image information P2 of a range for executing the focus detection is converted into a frequency area as the image information P1 converted into the frequency area information F1, a range desirous to be focused can be selected within the entire image pickup range using the image pickup device 30. Accordingly, the accuracy of the focus detection can be improved even when there are irregularities in the surface shape of the workpiece W.

(7) Further, since it is sufficient to execute the frequency converting process ST41, the product image generating process ST42, the power integrating process ST43 and the focus position calculating process ST5 with respect to only the range desirous to be focused, the information amount relating to these processings can be reduced and the processing speed can be increased.

(8) Further, the image information P1 can be efficiently obtained by controlling the image picking-up operation of the image pickup device 30 in association with the illuminating device 20, the distance driving device 50 and the rotation driving device 40. Further, the respective device and means are reliably operated in association with each other by controlling the operations of the illuminating device 20, the distance driving device 50, the rotation driving device 40 and the image pickup device 30 by the computer 61 so that the accuracy of the focus detection can be secured.

(9) The grating pattern 26B every predetermined angle within the image information P1 obtained by the multiple exposure can be clearly picked up without any movement by lighting the illuminating device 20 in a flash shape at the time interval corresponding to the rotating angle of the grating filter 26.

(10) Since the arithmetic operation for calculating the focus position is executed by the computer 61, the focus position can be instantaneously calculated from the obtained image information P1 so that working efficiency relating to the focus detection can be improved. In this case, processing required in the focus detection can be further efficiently executed by storing a contrast value calculating procedure, a focus position calculating procedure, a frequency filter of the grating pattern 26B calculated in advance, a generating procedure of the product image F2, etc. to the memory 63 of the computer 61 as programs or data, and reading and executing the programs, etc. by the CPU 66.

(11) If two or more plural image information P1 picked up in plural positions by the multiple exposure is obtained, the focus detectable distance is extended and the adjusting range can be enlarged. Otherwise, the accuracy of the focus detection can be improved by finely dividing the focus distance Z.

FIGS. 10A and 10B are views showing the schematic constructions of device main body sections 10A, 10B in an image measuring device in accordance with a second exemplary embodiment. The image measuring device of the second exemplary embodiment differs from that of the above first exemplary embodiment in that an image pickup device 80 for the focus detection is arranged separately from the CCD camera 34 for the image measurement. The other constructions (the illuminating device 20 and the device control section 60) are approximately similar to those in the first exemplary embodiment.

In FIG. 10A, the image pickup device 80 is constructed by arranging a half mirror 81 arranged between a half mirror 25 and a condenser lens 31 on the optical axis A, a Fourier transformation lens 82 arranged on the optical axis of reflected light from the half mirror 81, and a CCD camera 84 having a charge coupled device 83 for receiving light passing through the Fourier transformation lens 82. One portion of the reflected light from a workpiece W is transmitted through the sides of condenser lenses 31, 32 and the CCD camera 34 by the half mirror 81, and one portion of the remaining portion of the reflected light is reflected onto the sides of the Fourier transformation lens 82 and the CCD camera 84.

In FIG. 10B, the image pickup device 80 is constructed by arranging the half mirror 81 arranged instead of the reflecting mirror 24 of the first embodiment, the Fourier transformation lens 82 arranged on the optical axis of the transmission light from the half mirror 81, and the CCD camera 84 having the charge coupled device 83 for receiving the light passing through the Fourier transformation lens 82. Namely, the half mirror 81 reflects illumination light from the illuminating device 20 toward the half mirror 25, and the reflected light from the workpiece W reflected on the half mirror 25 is transmitted through the sides of the Fourier transformation lens 82 and the CCD camera 84.

In each of FIGS. 10A and 10B, light (the real image of the workpiece W) from the half mirror 81 is incident to the Fourier transformation lens 82 and is emitted as Fourier-transformed light (Fourier transformation image). This Fourier-transformed light is received and picked up by the charge coupled device 83 of the CCD camera 84 as the Fourier transformation image. The Fourier transformation image picked up by the CCD camera 84 is outputted to a computer through unillustrated cable and frame grabber as Fourier transformation image information (data). The exposure of the CCD camera 84 is controlled by an external trigger signal (pulse) transmitted from the frame grabber receiving commands from the computer.

The image measuring method in the image measuring device of this exemplary embodiment as mentioned above is approximately similar to that in the case of the first exemplary embodiment explained on the basis of the flow charts of FIGS. 3 and 4. The image measuring method of this exemplary embodiment differs from that of the first exemplary embodiment in that the frequency converting process ST41 included in the contrast value calculating process ST4 within FIG. 3 is omitted. Namely, in this exemplary embodiment, since light passing through the Fourier transformation lens 82 becomes light (Fourier transformation image) converted in frequency, the frequency converting process ST41 in the first exemplary embodiment can be omitted.

In this exemplary embodiment, the CCD camera controlled in the image input process ST3 means the CCD camera 84 arranged in the image pickup device 80.

Further, in this exemplary embodiment for executing the frequency conversion by using the Fourier transformation lens 82, it is not necessary to flash-light (ST33) the light emitting source (xenon flash lamp 21) in the image input process ST3. Therefore, a halogen lamp not flash-lighted may be also utilized as the light emitting source.

In accordance with this exemplary embodiment mentioned above, the following effects are obtained in addition to effects approximately similar to those of the above (1) to (3) and (8) to (11).

(12) Since the reflected light of the workpiece W passing through the Fourier transformation lens 82 is picked up as an image by the CCD camera 84 as Fourier transformation image information by adopting the Fourier transformation lens 82, it is not necessary to execute a frequency converting calculation using a dedicated arithmetic circuit, a computer, etc. Accordingly, time taken in the calculation is shortened and the focus detection can be executed at higher speed.

The focus detecting method, the focus detecting mechanism and the image measuring device having the focus detecting mechanism in the present invention are not limited to the above embodiments, but can be variously modified within the scope not departing from the features of the present invention.

For example, in the above embodiments, the image measuring device 1 is constructed by arranging the device main body section 10 and the device control section 60 respectively arranged as separate bodies. However, the image measuring device 1 is not limited to this construction, but the device main body section and the device control section may be also integrally constructed. Further, in the device main body section 10, the illuminating device 20, the image pickup device 30, the rotation driving device 40 and the distance driving device 50 are integrally arranged, but may be also arranged as separate bodies such that the illuminating device and the rotation driving device are set to an integral body and the image pickup device and the distance driving device are set to an integral body.

Further, in the above embodiments, the device control section 60 has the computer 61 having the memory 63, the image processing section 64, and the CPU 66. However, the device control section 60 is not limited to this construction, but the memory, the arithmetic device, etc. may be also respectively constructed by individual devices. Further, the device control section 60 and the device main body section 10 are not limited to the structure connected by the cable 2, but may be also constructed so as to transmit and receive a control signal, image data, etc. by a wireless communication means.

Further, in the above embodiments, the illuminating device 20 is used as an illuminating device for the focus detection. However, the illuminating device 20 is not limited to the illuminating device for the focus detection, but can be also utilized as an illuminating device for epi-illumination if the grating filter is arranged so as to be moved with respect to the forward position of the light emitting source. Further, the xenon flash lamp 21 is adopted as the light emitting source of the illuminating device 20. However, the light emitting source is not limited to the xenon flash lamp 21, but a light emitting diode may be also adopted. Further, the light emitting source of the illuminating device 20 is constructed so as to be flash-lighted. However, the light emitting source of the illuminating device 20 is not limited to this construction, but can be also constructed as follows. Namely, a shutter device is arranged between the light emitting source and the workpiece, or between the workpiece and the image pickup device. The illumination light from the illuminating device 20 is intermittently interrupted by opening and closing this shutter device, and the grating pattern of the grating filter is picked up every predetermined rotating angle. In accordance with such a construction, a halogen lamp not flash-lighted can be utilized as the light emitting source in addition to the xenon flash lamp and the light emitting diode.

As explained above, the effect of being able to execute the focus detection at high speed with high accuracy can be obtained in accordance with the various exemplary embodiments of the focus detecting method, the focus detecting mechanism, and the image measuring device having this focus detecting mechanism according to the present invention.

The focus detecting method of a first aspect according to an exemplary embodiment of the invention is a focus detecting method of an image measuring device having an image pickup device arranged on an optical axis crossing a measured object and picking-up the image of the measured object, and measuring said measured object from the picked-up image; wherein said image measuring device comprises an illuminating device having a light emitting source for irradiating illumination light toward said measured object; a grating filter arranged between this illuminating device and said measured object and projecting a grating pattern to the measured object by interrupting the illumination light from said light emitting source; a rotation driving device for rotating and operating this grating filter and changing the grating angle of the grating pattern projected to said measured object; and a distance driving device for operating at least one of said image pickup device and said measured object, and adjusting a mutual interval distance along said optical axis; and the focus detecting method comprises an image input process in which said distance driving device and the rotation driving device are operated in association with each other, and the grating pattern of said grating filter is projected to said measured object every predetermined rotating angle, and the image of said measured object every predetermined interval distance according to said predetermined rotating angle is picked up by said image pickup device by multiple exposure so that image information is obtained; a contrast value calculating process for calculating a contrast value every said predetermined rotating angle on the basis of frequency area information obtained by converting the obtained image information into a frequency area; and a focus position calculating process for calculating a focus position from the interval distance between said image pickup device and said measured object according to the rotating angle for maximizing said contrast value.

Here, a camera having an image pickup section for converting the optical image of an image pickup tube, an image pickup element, or the like into an electric signal, and an image pickup optical system for forming the image of the measured object in this image pickup section can be adopted as the image pickup device. When the image pickup device is operated by the distance driving device, the camera, a box body for arranging the camera therein, etc. may be operated, and a lens of the image pickup optical system, etc. may be also operated.

In accordance with such a construction, since the image information picked up by the image pickup device is picked up by the multiple exposure, the image information includes information picked up in plural positions with respect to the interval distance between the image pickup device and the measured object using the distance driving device. Therefore, it is not necessary to pick up plural images in the plural distance positions so that time for picking up the image information can be shortened. Further, since it is not necessary to process the plural images, time taken in the image processing can be also shortened so that the focus detection can be executed at high speed.

Further, since the contrast value is calculated on the basis of the frequency area information obtained by converting the image information into the frequency area instead of the obtained image information itself in the contrast value calculating process, the focus detection can be accurately executed without having any influence of the surface shape and pattern of the measured object, etc. Namely, for example, in the case of the measured object having a striped pattern on its surface, there is a case in which this striped pattern and the grating pattern using the grating filter interfere with each other in accordance with the rotating angle of the grating filter, and the contrast within the image information is greatly changed. However, the influence of the contrast change due to such interference is removed by converting the image information into the frequency area, and the contrast value of the grating pattern corresponding to the interval distance between the image pickup means and the measured object can be accurately calculated.

Since the distance driving device and the rotation driving device are operated in association with each other, the contrast of the grating pattern included in the picked-up image information is changed in accordance with the interval distance between the image pickup device and the measured object, and the contrast of the grating pattern picked up in the position near the focus position is raised. Thus, even when the image information is obtained by the multiple exposure and the grating patterns of plural rotating angle positions are picked up, the focus position can be detected with high accuracy by calculating the rotating angle position of the high contrast from this image information.

Further, since the grating angle of the grating pattern projected in picking-up the image by the multiple exposure can be easily finely set, i.e., the predetermined rotating angle can be easily reduced by controlling the operation of the rotation driving device, it is possible to improve the detecting accuracy of the focus position required in accordance with the rotating angle.

Further, since the image information for the focus detection is obtained by the image pickup device for the image measurement for picking-up the image of the measured object and the focus position can be calculated on the basis of this image information, the image measuring device can be set to a simple structure and can be made compact in comparison with the conventional image measuring device. The device structure can be simplified and made compact since the image pickup device can be utilized in both the image measurement and the focus detection.

The focus detecting method of a second aspect according to an exemplary embodiment of the invention is characterized in that, in the focus detecting method of the image measuring device according to the first aspect of an exemplary embodiment of invention, said contrast value calculating process has a frequency converting process for calculating the frequency area information by converting the image information obtained in said image input process into the frequency area; a product image generating process for generating a product image every said predetermined rotating angle by overlapping a frequency filter relative to the grating pattern every said predetermined rotating angle of said grating filter calculated in advance with the converted frequency area information; and a power integrating process for integrating power every pixel constituting the product image with respect to each generated product image every said predetermined rotating angle.

Here, as a method for calculating the frequency area information in the frequency converting process, it is possible to adopt an orthogonal transformation technique such as two-dimensional Fourier transformation (two-dimensional FFT), Winograd transformation, Karhunen-Loeve transformation, discrete cosine transformation (DCT), or the like. Further, in addition to these techniques, it is also possible to adopt another orthogonal transformation technique if this technique converts the image information into a frequency component.

Further, as the frequency filter relative to the grating pattern every predetermined rotating angle of the grating filter calculated in advance, it is possible to utilize the frequency area information of the grating pattern calculated by the orthogonal transformation from the image information in which only the grating pattern including no measured object is picked up. Further, a frequency filter for frequency-converting the image information of the grating pattern made by a simulation using a computer, etc. may be also utilized.

In accordance with such a construction, processing for calculating the contrast value every predetermined rotating angle can be executed at high speed by converting the image information obtained by the frequency converting process into the frequency area information. In this case, if only the image information of a range for executing the focus detection is converted into the frequency area as the image information converted into the frequency area information, it is possible to select a range desirous to be focused within the entire image pickup range using the image pickup means. Accordingly, the accuracy of the focus detection can be improved irrespective of the surface shape of the workpiece. Further, since it is sufficient to execute the frequency converting process, the product image generating process, the power integrating process and the focus position calculating process with respect to only the range desirous to be focused, the information amount required in these processings is reduced and the processing speeds can be increased.

The focus detecting method of a third aspect according to an exemplary embodiment of the invention is characterized in that said frequency area information calculated in said frequency converting process is calculated by two-dimensional Fourier transformation in the focus detecting method of the image measuring device according to an exemplary embodiment of the second aspect of an exemplary embodiment of the invention.

In accordance with such a construction, the processing in the frequency converting process can be executed at high speed by adopting the two-dimensional Fourier transformation (two-dimensional FFT) as a technique for calculating the frequency area information by orthogonally transforming the image information as two-dimensional data.

The focus detecting method of a fourth aspect according to an exemplary embodiment of the invention is characterized in that said image information obtained in said image input process is set to one information in the focus detecting method of the image measuring device according to any one of the first to third aspects of an exemplary embodiment of the invention.

In accordance with such a construction, time for picking-up the image information can be further shortened since information picked up in plural positions by the multiple exposure is included within one image information picked up by the image pickup device. Further, since it is sufficient to set image information for executing the image processing to one image information, time taken in the image processing can be shortened and the focus detection can be executed at higher speed.

The focus detecting method of a fifth aspect according to an exemplary embodiment of the invention is characterized in that said image information obtained in said image input process is set to two or more information in the focus detecting method of the image measuring device according to any one of the first to third aspects of an exemplary embodiment of the invention.

In accordance with such a construction, the distance range (focus detecting range) between the image pickup means and the measured object can be enlarged by obtaining two or more plural image information picked up in the plural positions by the multiple exposure. Namely, when the grating filter is rotated from 0 degree to 180 degrees, the same grating pattern as the case of 0 degree is projected (since one cycle=180 degrees). Therefore, no angles of the grating patterns included within one image information are overlapped with each other and the focus detection can be reliably executed with respect to the focus detecting range according to the number of image information by picking-up the image information every one cycle and obtaining its plural image information.

Further, the accuracy of the focus detection can be improved by relatively reducing the operating speed of the distance driving device (finely setting the focus detecting pitch) with respect to the rotating speed of the grating filter as well as the enlargement of the focus detecting range. In this case, even when the operating speed of the distance driving device is reduced, the focus detection can be executed by picking-up the plural image information with respect to a predetermined distance range without shortening the focus detecting range.

The focus detecting mechanism of a sixth aspect according to an exemplary embodiment of the invention is a focus detecting mechanism characterized in that the focus detecting mechanism comprises an image pickup device arranged on an optical axis crossing a measured object and picking-up the image of the measured object; an illuminating device having a light emitting source for irradiating illumination light toward said measured object; a grating filter arranged between this illuminating device and said measured object and projecting a grating pattern to the measured object by interrupting the illumination light from said light emitting source; a rotation driving device for rotating and operating this grating filter and changing the grating angle of the grating pattern projected to said measured object; and a distance driving device for operating at least one of said image pickup device and said measured object, and adjusting a mutual interval distance along said optical axis; and a focus position calculating device in which said distance driving device and the rotation driving device are operated in association with each other, and the grating pattern of said grating filter is projected to said measured object every predetermined rotating angle, and the image of said measured object every predetermined interval distance according to said predetermined rotating angle is picked up by said image pickup device by multiple exposure, and a contrast value every said predetermined rotating angle is calculated on the basis of frequency area information obtained by converting the picked-up image information into a frequency area, and a focus position is calculated from the interval distance between said image pickup device and said measured object according to the rotating angle for maximizing this contrast value.

In accordance with such a construction, operating effects similar to those in the first aspect of an exemplary embodiment of the invention can be obtained.

Namely, the focus detection can be executed at high speed with high accuracy. Further, in comparison with the conventional image measuring device, the device can be set to a simple structure and can be made compact.

The focus detecting mechanism of a seventh aspect according to an exemplary embodiment of the invention is characterized in that, in the focus detecting mechanism according to the sixth aspect of an exemplary embodiment of the invention, said focus position calculating device calculates the frequency area information by converting said obtained image information into the frequency area, and generates a product image every said predetermined rotating angle by overlapping a frequency filter relative to the grating pattern every said predetermined rotating angle of said grating filter calculated in advance with this frequency area information, and calculates said contrast value by integrating power every pixel constituting the product image with respect to each product image.

In accordance with such a construction, similar to the second aspect of an exemplary embodiment of the invention, it is possible to execute processing for calculating the contrast value every predetermined rotating angle at high speed.

The focus detecting mechanism of an eighth aspect according to an exemplary embodiment of the invention is characterized in that the image pickup operation of said image pickup device is controlled in association with said illuminating device, the distance driving device and the rotation driving device in the focus detecting mechanism according to the sixth or seventh aspect of an exemplary embodiment of the invention.

In accordance with such a construction, the image information can be efficiently obtained by controlling the image pickup operation of the image pickup device in association with the illuminating device, the distance driving device and the rotation driving device.

The focus detecting mechanism of a ninth aspect according to an exemplary embodiment of the invention is characterized in that the lighting of said illuminating device is controlled in a flash shape at a time interval corresponding to said predetermined rotating angle of said grating filter in the focus detecting mechanism according to any one of the sixth to eighth aspect of an exemplary embodiment of the invention.

In accordance with such a construction, the grating pattern every predetermined angle within the image information obtained by the multiple exposure can be clearly picked up without any movement by lighting the illuminating device in a flash shape at a time interval corresponding to the rotating angle of the grating filter. When the grating pattern projected by the grating filter rotated by the rotation driving device is continuously picked up, the image of the grating pattern is moved so that no image of the grating pattern projected every predetermined angle is obtained. Therefore, the grating pattern is projected only at the lighting time of the illuminating device lighted in the flash shape so that the grating pattern every predetermined angle can be picked up.

The focus detecting mechanism of a tenth aspect according to an exemplary embodiment of the invention is a focus detecting mechanism characterized in that the focus detecting mechanism comprises an image pickup device arranged on an optical axis crossing a measured object and picking-up the image of the measured object; a Fourier transformation lens arranged between this image pickup device and said measured object and converting reflected light from the measured object into a frequency; an illuminating device having a light emitting source for irradiating illumination light toward said measured object; a grating filter arranged between this illuminating device and said measured object and projecting a grating pattern to the measured object by interrupting the illumination light from said light emitting source; a rotation driving device for rotating and operating this grating filter and changing the grating angle of the grating pattern projected to said measured object; and a distance driving device for operating at least one of said image pickup device and said measured object, and adjusting a mutual interval distance along said optical axis; and a focus position calculating device in which said distance driving device and the rotation driving device are operated in association with each other, and the grating pattern of said grating filter is projected to said measured object every predetermined rotating angle, and the image of said measured object every predetermined interval distance according to said predetermined rotating angle is picked up by said image pickup device through said Fourier transformation lens by multiple exposure, and a contrast value every said predetermined rotating angle is calculated on the basis of the picked-up Fourier transformation image information, and a focus position is calculated from the interval distance between said image pickup device and said measured object according to the rotating angle for maximizing this contrast value.

In accordance with such a construction, operating effects similar to those in the sixth aspect of an exemplary embodiment of the invention can be obtained.

Namely, the focus detection can be executed at high speed with high accuracy. Further, since the Fourier transformation lens is adopted, the reflected light of the measured object passing through the Fourier transformation lens is picked up by the image pickup device as Fourier transformation image information. Accordingly, it is not necessary to execute a frequency conversion arithmetic operation using a dedicated arithmetic circuit, a computer, etc. Thus, time taken in the arithmetic operation is shortened and the focus detection can be executed at higher speed.

The image measuring device of an eleventh aspect according to the an exemplary embodiment of invention is characterized in that the image measuring device has one of the above focus detecting mechanisms, and the focus position calculating device constituting said focus detecting mechanism is executed by a computer having a memory and an arithmetic device.

In accordance with such a construction, operating effects similar to those in the sixth to tenth aspects of an exemplary embodiment of the invention can be obtained.

Further, since the operation of the focus position calculating device is executed by the computer, the focus position can be instantaneously calculated from the obtained image information, and working efficiency relating to the focus detection can be improved. In this case, the calculating procedure of the frequency area information, the frequency filter of the grating pattern calculated in advance, the generating procedure of the product image, the calculating procedure of the contrast value, the calculating procedure of the focus position, etc. are stored to the memory of the computer as programs or data, and the programs, etc. are read and executed by an arithmetic device. Thus, the processing required in the focus detection can be further efficiently executed.

The image measuring device of a twelfth aspect according to an exemplary embodiment of the invention is characterized in that the operations of the illuminating device, the distance driving device and the rotation driving device constituting said focus detecting mechanism are controlled by said computer in the image measuring device according to the eleventh aspect of an exemplary embodiment of the invention.

In accordance with such a construction, the illuminating device, the distance driving device and the rotation driving device can be reliably operated in association with each other by controlling the operations of the illuminating device, the distance driving device and the rotation driving device by the computer. Accordingly, the accuracy of the focus detection can be secured.

While particular embodiments have been described, alternatives, modifications, variations and improvements may be implemented within the spirit and scope of the invention.

What is claimed is:

1. A focus detecting method of an image measuring device having an image pickup device arranged on an optical axis that crosses a measured object and picking-up an image of the measured object, and measuring said measured object from the picked-up image;

wherein said image measuring device comprises an illuminating device having a light emitting source that irradiates illumination light toward said measured object; a grating filter arranged between the light emitting source and said measured object and projecting a grating pattern to the measured object by interrupting the illumination light from said light emitting source; a rotation driving device that rotates and operates the grating filter and changes the grating angle of the grating pattern projected to said measured object; and a distance driving device that operates at least one of said image pickup device and said measured object, and adjusts a mutual interval distance along said optical axis; and the focus detecting method comprises:

an image input process in which said distance driving device and the rotation driving device are operated in association with each other, and the grating pattern of said grating filter is projected to said measured object for every predetermined rotating angle, and the image of said measured object for every predetermined interval distance according to said predetermined rotating angle is picked up by said image pickup device by multiple exposure so that image information is obtained;

a contrast value calculating process that obtains a contrast value for every said predetermined rotating angle on a basis of frequency area information obtained by converting the obtained image information into a frequency area; and a focus position calculating process that obtains a focus position from the interval distance between said image pickup device and said measured object according to the rotating angle for maximizing said contrast value.

2. The focus detecting method of the image measuring device according to claim 1, wherein said contrast value calculating process includes:

a frequency converting process for calculating the frequency area information by converting the image information obtained in said image input process into the frequency area;

a product image generating process for generating a product image for every said predetermined rotating angle by overlapping a frequency filter relative to the grating pattern for every said predetermined rotating angle of said grating filter calculated in advance with the converted frequency area information; and a power integrating process for integrating power for every pixel constituting the product image with respect to each generated product image for every said predetermined rotating angle.

3. The focus detecting method of the image measuring device according to claim 2, wherein said frequency area information calculated in said frequency converting process is calculated by two-dimensional Fourier transformation.

4. The focus detecting method of the image measuring device according to claim 1, wherein said image information obtained in said image input process is set to one information.

5. The focus detecting method of the image measuring device according to claim 1, wherein said image information obtained in said image input process is set to two or more information.

6. A focus detecting mechanism, comprising:

an image pickup device arranged on an optical axis crossing a measured object and picking-up an image of the measured object;

an illuminating device having a light emitting source that irradiates illumination light toward said measured object;

a grating filter arranged between the illuminating device and said measured object and projecting a grating pattern to the measured object by interrupting the illumination light from said light emitting source;

a rotation driving device that rotates and operates the grating filter and changes a grating angle of the grating pattern projected to said measured object;

a distance driving device that operates at least one of said image pickup device and said measured object, and adjusts a mutual interval distance along said optical axis; and a focus position calculating device in which said distance driving device and the rotation driving device are operated in association with each other, and the grating pattern of said grating filter is projected to said measured object for every predetermined rotating angle, and the image of said measured object for every predetermined interval distance according to said predetermined rotating angle is picked up by said image pickup device by multiple exposure, and a contrast value for every said predetermined rotating angle is calculated on a basis of frequency area information obtained by converting the picked-up image information into a frequency area, and a focus position is calculated from the interval distance between said image pickup device and said measured object according to the rotating angle for maximizing the contrast value.

7. The focus detecting mechanism according to claim 6, wherein said focus position calculating device calculates the frequency area information by converting said obtained image information into the frequency area, and generates a product image for every said predetermined rotating angle by overlapping a frequency filter relative to the grating pattern for every said predetermined rotating angle of said grating filter calculated in advance with this frequency area information, and calculates said contrast value by integrating power for every pixel constituting the product image with respect to each product image.

8. The focus detecting mechanism according to claim 6, wherein an image pickup operation of said image pickup device is controlled in association with said illuminating device, the distance driving device and the rotation driving device.

9. The focus detecting mechanism according to claim 6, wherein the lighting of said illuminating device is controlled in a flash shape at a time interval corresponding to said predetermined rotating angle of said grating filter.

10. A focus detecting mechanism, comprising:

an image pickup device arranged on an optical axis crossing a measured object and picking-up an image of the measured object;

a Fourier transformation lens arranged between the image pickup device and said measured object and converting reflected light from the measured object into a frequency;

an illuminating device having a light emitting source that irradiates illumination light toward said measured object;

a grating filter arranged between the illuminating device and said measured object and projecting a grating pattern to the measured object by interrupting the illumination light from said light emitting source;

a rotation driving device that rotates and operates the grating filter and changes a grating angle of the grating pattern projected to said measured object;

a distance driving device that operates at least one of said image pickup device and said measured object, and adjusts a mutual interval distance along said optical axis; and a focus position calculating device in which said distance driving device and the rotation driving device are operated in association with each other, and the grating pattern of said grating filter is projected to said measured object for every predetermined rotating angle, and the image of said measured object for every predetermined interval distance according to said predetermined rotating angle is picked up by said image pickup device through said Fourier transformation lens by multiple exposure, and a contrast value for every said predetermined rotating angle is calculated on a basis of the picked-up Fourier transformation image information, and a focus position is calculated from the interval distance between said image pickup device and said measured object according to the rotating angle for maximizing the contrast value.

11. An image measuring device having the focus detecting mechanism according to claim 6, wherein the focus position calculating device constituting said focus detecting mechanism is executed by a computer having a memory and an arithmetic device.

12. The image measuring device according to claim 11, wherein operations of the illuminating device, the distance driving device and the rotation driving device constituting said focus detecting mechanism are controlled by said computer.

13. A method for detecting focus in an image measuring device, comprising:

providing a grating pattern to be projected onto a measured object at an angle between an orientation of the grating pattern and a reference direction and at a distance between the measured object and an image pick-up device of the image measuring device;

performing a first projection of the grating pattern onto the measured object at a first angle and at a first distance;

performing a second projection of the grating pattern onto the measured object at a second angle and at a second distance;

obtaining a first contrast value and a second contrast value based on the first and second projections, respectively; and determining a focus distance based on the first and second contrast values.

14. The method of claim 13, further comprising:

obtaining a single image containing the first and second projections.

* * * * *